Nov. 28, 1933.  J. H. KNOWLES  1,936,628
FLOAT CONTROLLED APPARATUS
Filed Nov. 17, 1930  2 Sheets-Sheet 1
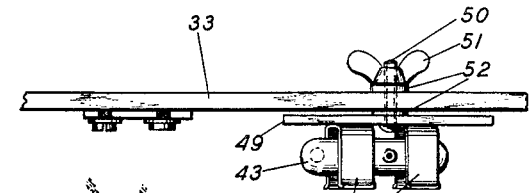
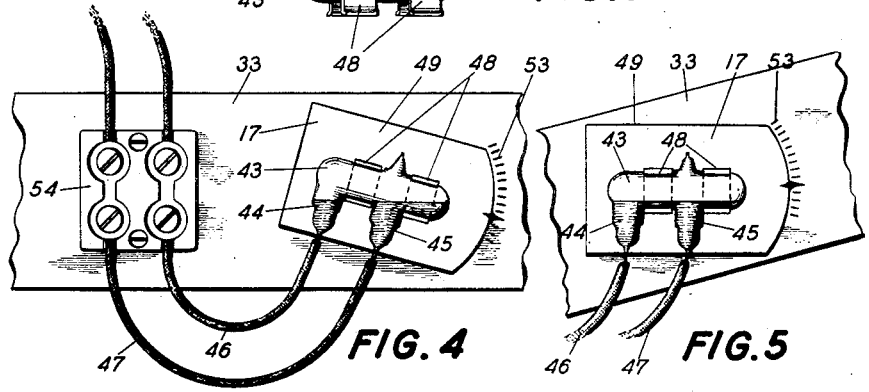
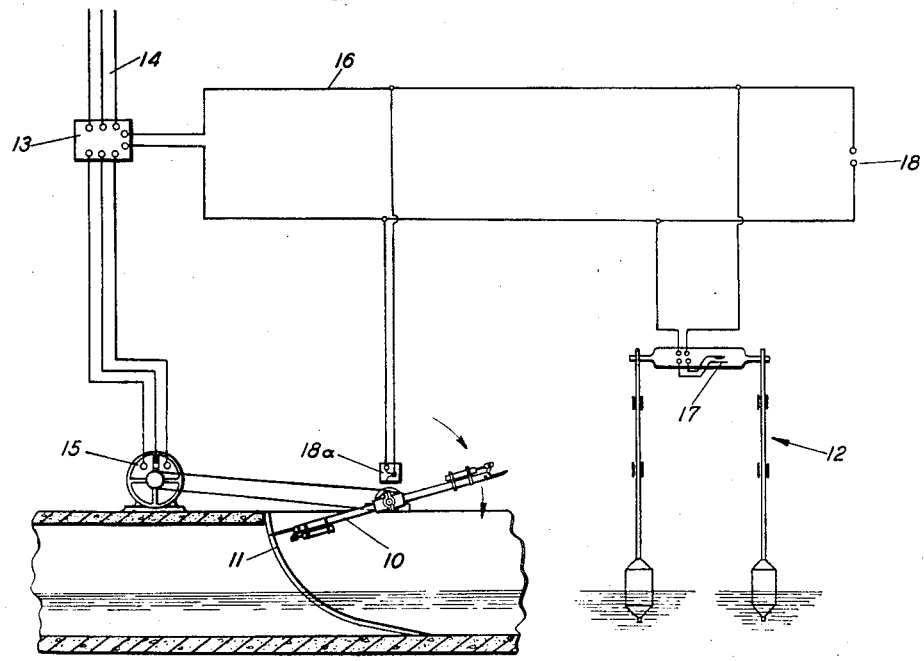
INVENTOR.
JOHN H. KNOWLES
BY
ATTORNEY.

Nov. 28, 1933.    J. H. KNOWLES    1,936,628
FLOAT CONTROLLED APPARATUS
Filed Nov. 17, 1930    2 Sheets-Sheet 2
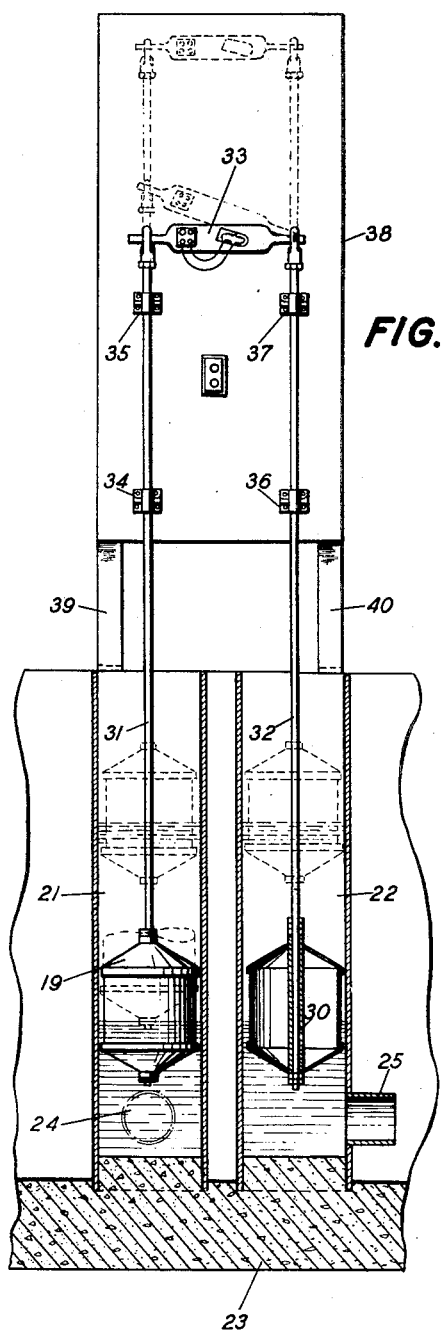
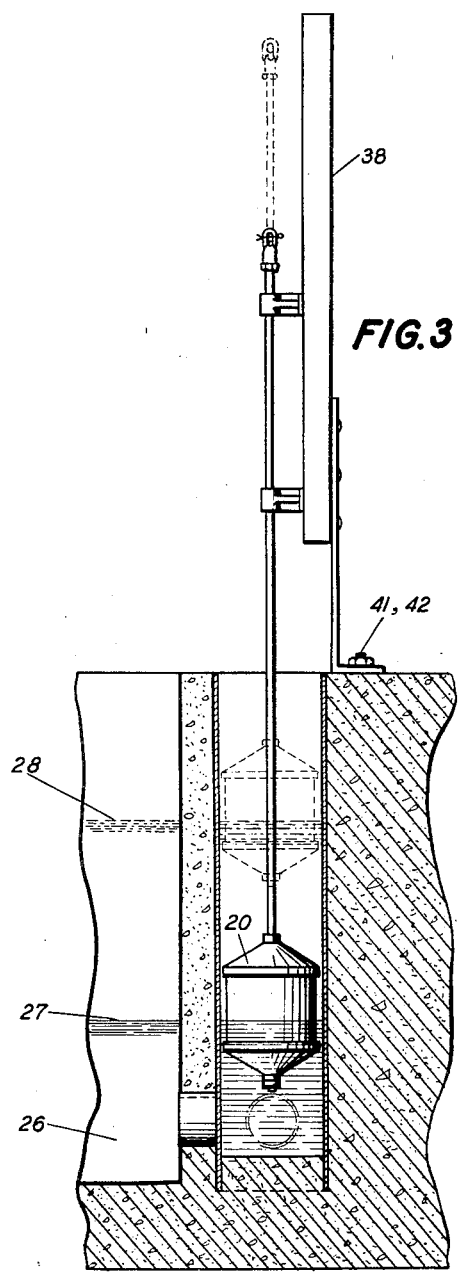
INVENTOR.
JOHN H. KNOWLES
BY Arthur Middleton
ATTORNEY.

Patented Nov. 28, 1933

1,936,628

UNITED STATES PATENT OFFICE 1,936,628

FLOAT CONTROLLED APPARATUS

John H. Knowles, Scarsdale, N. Y., assignor, by mesne assignments, to The Dorr Company, Inc., New York, N. Y., a corporation of Delaware Application November 17, 1930
Serial No. 496,153

4 Claims. (Cl. 210—176)

This invention relates to automatic control mechanism responsive to the change in the level of liquid bodies in order to maintain the liquid at certain required levels.

More particularly this relates to what may be called a differential liquid level control or mechanism, that is, such as will ony respond to the relative difference in the levels of two liquid bodies. The present is essentially an improvement over the type of float control shown in the patent to Wallene No. 1,411,945. In that patent a differential float control is used to control the operation of a sewage bar screen cleaning device in response to an objectionable rise of liquid on the influent side of the screen due to blinding thereof. The float control communicates with the pulpy or solids containing liquid before the screen, and with the screened liquid back of the screen and operates in such a way that whenever the screen on the influent side of the liquid becomes objectionably blinded or clogged with screenings and the liquid level on that side rises appreciably over the one behind the screen, such superelevation or difference in levels will cause the float control to respond through certain differential mechanism and to periodically operate the screen cleaning device to remove the solids therefrom until the normal uniform level fore and aft the screen is restored.

One feature of the present invention lies in the provision of a largely simplified differential mechanism. I prefer to employ float-operated means arranged to respond to the level of each body and means interconnected with said float operated means to indicate directly any change in liquid level.

Another feature provides that the differential responsive means be a member or lever capable of both linear and rotary movement, which by its linear component will adapt itself to high and low water levels, and which through the rotary movement will indicate the amount of differential change.

In other words a general rise of the liquid will raise both floats uniformly without effecting the functioning of the control, whereas a difference in the levels will cause the floating lever to move pivotally and thereby operate the control.

Other features reside in the arrangement of a member or lever pivoted to respond to differential pressures of buoyancy exerted each upon one end of the lever, further in a suitable arrangement of an electric switch operated by the rotary movement of the lever, and in the preferred use of a mercury switch operated by the movement of said lever and mounted directly thereon. This improved differential liquid level control mechanism includes a pair of float members and means by which both float members are continuously and movably interconnected in such a manner that the movable interconnection serves to indicate the differential change in the position of the floats.

In the embodiment herein shown the interconnection between the float member consists of an arrangement of elements or levers which is self-contained and supported upon the float members. Accordingly it is unitary with the float members and bodily floats therewith.

In order to illustrate the invention, I have shown one embodiment thereof in the accompanying drawings in which shows a front view of my device.

Fig. 1 shows a wiring diagram indicating the hookup of the control device and the cleaning device, and various switches.

Fig. 2 shows a front view of the float control device.

Fig. 3 shows a side view of the float control device.

Fig. 4 shows an enlarged detail view of a mercury switch controlled by and mounted upon a fulcrum member, with the switch tilted in open position.

Fig. 5 shows the mercury switch tilted in closed position.

Fig. 6 is a plan view of Fig. 4 showing the mounting of the mercury switch.

Fig. 1 shows diagrammatically a sewage bar screen cleaning device 10, a bar screen 11, a float device 12 for controlling the operation of the cleaning device. 13 indicates an automatic power switch connecting the power line 14 with a motor 15 indicated to drive the cleaning device 10. The power switch is controlled through a pilot wire 16 either automatically from a relay mercury switch 17 of the float control, or arbitrarily from a start and stop pushbutton arrangement 18. A separate stop switch 18a is provided to be controlled or tripped by the movement of screen cleaning device.

The float device 12 includes floating bodies 19 and 20 lodged in their respective tubular float chambers 21 and 22 shown to be embedded in a concrete foundation 23 or the like and communicating with their respective liquid bodies through the connections or conduits 24 and 25. The liquid bodies are the one before and back of the screen in a sewage channel or flume indicated at 26 and showing at 27 and 28 respectively the marks for high and low water. Each float 19 and 20 is formed with a central tube member 29 and 30 through each of which a float rod 31 and 32 respectively may extend. Each float rod carries at its lower end a float and extends upwardly both rods to be linked together at their upper ends by a member or lever 33. Each rod 31 and 32 is guided in a pair of brackets 34, 35 and 36, 37 mounted upon what is shown as a panelboard 38 carried by standards 39 and 40 or the like which in turn are secured by anchor bolts 41 and 42 upon the concrete foundation. The lever 33 carries mounted upon its center portion the relay or mercury switch 17 which may be of standard make including a glass tube 43 mounted and formed with two depending legs 44 and 45 connected to the flexible conduits or cables 46, 47 and filled with the necessary amount of mercury. The glass tube 43 is held by clasps 48 which in turn are fastened upon a base 49. By means of bolt 50 and wing screw 51 and interposed washers 52 the base 49 is adjustably mounted upon the lever 33 and may be properly adjusted thereon as per graduations 53.

Through a connecting block 54 upon the lever and through flexible cable connections 55 the mercury switch is connected to the pilot wire 16. In Fig. 4 the mercury switch is shown in open condition while in Fig. 5 in closed condition.

The operation of the float operated control is as follows: The level in both float chambers rising uniformly due to a general increase in the quantity of flow in the channel or sewer, will not effect a movement of the control mechanism proper, the liquid merely uniformly raises the floats together with the float rods and the lever 33 and leaves the lever 32 in balanced or first position. However at a certain predetermined variation between the two liquid bodies caused by the fluiding of the screen the relative position of the floats 19 and 20 will change and the lever 38 will swing correspondingly to the dot and dash position, tilting the mercury switch and causing the same to make contact, and operate the screen cleaning device as indicated in the diagram Fig. 6. The flexibility of the cable connection 55 allowing unhampered up and down, as well as rotary movement of the lever 33. As the mercury switch closes it releases the power-switch 13 thus starting the motor 15 to drive the cleaning device. It is preferred to delay the stopping of the cleaning device until after the water levels are equalized. Therefore a separate automatic stop switch is provided to arrest the cleaning device after a certain amount of movement. It may be a trip switch operated by cleaning device itself after say one full revolution thereof. Such arrangement will insure against the cleaning device operating at too short an interval, such as might occur, were the operation solely dependent upon the opening and closing of the mercury switch. For it can be readily seen that the mercury switch once closed would quickly open again as the water levels equalize through the screen, without giving the cleaning device a chance to effectively clean the same.

There has been described one embodiment of the invention which has been shown in an illustrative sense and not a limiting one for obviously the invention is capable of other embodiments and modifications without departing from the spirit and scope thereof.

By way of example, whereas rods have been shown as means to carry the floats and thus operate the lever carrying the switch, chains or other flexible devices could be used, the weight of the float on the low level side serving to operate the lever instead of the combined push and pull of the rods, or a combination of pulleys and counterweights might be employed.

Still other variations might be used to fall within the scope of the invention as defined by the claims.

I claim:

1. In a differential liquid level operated mechanism, adapted for use with a plurality of liquid bodies having relatively variable levels, float operated means arranged to respond to the level of each body, and means continuously and movably interconnecting said float operated means and unitary therewith and effective to indicate directly any change in relative liquid level.

2. In a differential liquid level operated mechanism, adapted for the use with two liquid bodies having variable levels, the combination with a float upon each liquid body, of lever means for interconnecting said floats, and arranged to bodily float therewith, whereby the lever means are responsive to differential changes of the liquid levels, and means operated by said lever means to indicate said differential changes.

3. A differential liquid level operated mechanism comprising a screen member adapted to have a body of liquid on each side thereof, a screen cleaning device, means operable by differential variations of the bodies, means actuated by said differential responsive means to start operative the screen cleaning device, and a trip switch associated with said cleaning device to terminate the operation thereof at a predetermined point.

4. For use in a motor-driven sewage bar screen cleaner, an automatic control mechanism effective to initiate the cleaning operation of the screen when the water levels on each side of the screen are unequal, and to cause the cleaner to cease operating when the water levels return to equality, comprising a pair of floats, each float responsive to the liquid level on one side of the screen, and an indicator member operated directly from said floats, connections between said floats and said indicator effective to impart to said indicator linear movement corresponding to the common fluctuation of the water levels, and also rotary movement by which to measure the relative difference of the water levels ahead of and behind the screen.

JOHN H. KNOWLES.